Patented Feb. 26, 1935

1,992,917

UNITED STATES PATENT OFFICE 1,992,917

WATER-INSOLUBLE AZO-DYESTUFF

Werner Kirst and Max Kerth, Frankfort-on-the-Main, Germany, assignors to General Aniline Works, Inc., New York, N. Y., a corporation of Delaware No Drawing. Application July 8, 1931, Serial No. 549,560. In Germany May 14, 1928

6 Claims. (Cl. 260—76)

Our present invention relates to water-insoluble azo-dyestuffs and to fiber dyed therewith.

More particularly it relates to green water-insoluble azo-dyestuffs which are obtainable by combining a monodiazonium salt of an anthraquinone compound which as non-diazotized amino-compound has a blue color and, on diazotization, does not undergo any alteration in its structure, apart from the conversion of the amino group into the diazonium group, with an acetoacetic acid arylide, an arylamide of a carboxyphenyl-methyl-pyrazolone, or with a urea obtained from a pyrazolone.

We have found that green azo-dyestuffs are obtainable by combining the above mono-diazonium compounds obtained from bases which as such have a blue color with the said coupling components, which latter may be designated as "yellow components". The dyestuffs represent a new class of azo-dyestuffs, they may be produced in substance, on the fiber and on any substrata which are adapted for the production of lakes. The shades of the dyestuffs vary from yellowish-green to olive-green according to the components used. The present invention is of great importance, especially as regards the production of the dyestuffs on the fiber, since it has not been possible, hitherto, to produce green dyeings on the fiber according to the so-called ice-color-method by combining on the fiber a diazonium compound with a coupling component of the group designated above as "yellow components". The dyeings and printings hitherto produced by means of such coupling components and diazonium- or tetrazonium compounds posses yellow, orange and maroon shades; hence the name "yellow components".

By the expression "which, on diazotization, do not undergo any alteration in their structure" we understand that no amino compounds are to be used which, on diazotization, by the action of nitrous acid undergo a change in a group or a substituent other than the amino group to be diazotized. By such secondary reaction certain substituents in the compounds may be so altered that, when coupling with the above mentioned yellow components, green tints can no longer be obtained. As an example of an amino compound which on diazotization, besides the conversion of the amino group into the diazonium group, undergoes a further change, there may be mentioned the 1-amino-4-diethylaminoanthraquinone. This amino compound as such has a blue color, but it is not suitable for the production of green dyestuffs by coupling its diazo compound with one of the above mentioned yellow components since, on diazotization, the diethylamino-group probably is destroyed.

The diazonium compounds produced from blue colored bases are not in all cases blue; they may have a color different from that of the amino compound.

The present invention is illustrated by a number of examples: it is pointed out, however, that the combinations mentioned in these examples and the several components used for their preparation only serve as illustrations and that the invention is not limited to the examples contained in this specification. Any other amino-compound which contains an anthraquinone nucleus, has a blue color and, on diazotization, apart from the conversion of the amino group into the diazonium group, undergoes no alteration in its structure, may be used for the purpose of the present invention. As regards the components designated "yellow components" and used for coupling with the mono-diazonium compounds, the invention, likewise, is not restricted to the particular components mentioned in the following examples. Various substituted or unsubstituted acetoacetic acid arylides, condensation products from carboxyphenyl-methyl pyrazolones and aromatic amines, or ureas from pyrazolones may be used.

Since an object of the present invention is to provide green water-insoluble azo-dyestuffs of good fastness properties and since the dyestuffs produced on the fiber must be fast to the action of alkalies, it is to be understood that the presence of substituents which would render the dyestuffs soluble in water or alkalies and tend to depreciate the fastness of the dyestuffs to alkalies must be avoided. Substituents of this kind are, for instance, the sulfonic acid and the carboxylic acid group. Such groups are not included within the scope of the appended claims.

The following examples serve to illustrate the invention, but they are not intended to limit it thereto.

The production of the new dyestuffs on the fiber may be carried out according to various methods used in dyeing or printing, for instance, as follows:

(a) *Examples 1 to 8:—Method for dyeing cotton or viscose yarn in the tube*

50 grams of boiled cotton yarn are treated for half an hour with the grounding liquor, prepared according to the following examples, squeezed or hydroextracted in order to remove the excess of the liquid and, thereupon, dyed while still wet for half-an-hour in the developing bath. The dyeing obtained is rinsed, treated in a boiling soap bath, rinsed again and dried.

(b) *Examples 9 to 11:—Method for dyeing piece goods*

The material is padded with the grounding liquor by means of a foulard-machine, squeezed and dried, passed through the developing bath and, after a short airing, washed and soaped in a boiling bath.

(c) *Examples 12 and 13:—Method for printing cotton or artificial silk materials*

The bleached material is padded with the grounding liquor, dried and printed with the printing paste. The printed material is dried, rinsed and soaped in a boiling bath containing 3 grams of soap and 1 gram of calcined sodium carbonate per liter, again rinsed and dried.

(1) *I. Grounding liquor*

| | | |
|---|---|---|
| 1.75 | grams | of diacetoacetyl-ortho-tolidide are dissolved, while boiling, with |
| 3.5 | cc. | of Turkey red oil of 50% strength, |
| 2.6 | cc. | of caustic soda solution of 34° Bé. and |
| 14 | grams | of sodium sulfate. This solution is made up with water to |
| 1 | liter | |

*II. Developing bath*

| | | |
|---|---|---|
| 3.14 | grams | of 1-amino-4-hexahydrophenylaminoanthraquinone are diazotized with |
| 3.8 | cc. | of hydrochloric acid and |
| 0.8 | gram | of sodium nitrite; thereupon about |
| 4 | grams | of sodium acetate and |
| 25 | grams | of sodium chloride are added. The whole is made up with cold water to |
| 1 | liter | |

A green dyeing of good fastness properties is obtained. The dyestuff formed has the following structure:

(2) *I. Grounding liquor*

| | | |
|---|---|---|
| 1.75 | grams | of diacetoacetyl-ortho-tolidide are dissolved as described in Example 1, the solution is made up with water to |
| 1 | liter | |

*II. Developing bath*

| | | |
|---|---|---|
| 2.8 | grams | of 1-amino-4-n-propylaminoanthraquinone are diazotized with |
| 3.8 | cc. | of hydrochloric acid and |
| 0.8 | gram | of sodium nitrite. Thereupon about |
| 4 | grams | of sodium acetate and |
| 25 | grams | of sodium chloride are added. The solution is made up with cold water to |
| 1 | liter | |

A green dyeing of good fastness properties is obtained. The dyestuff formed is represented by the formula

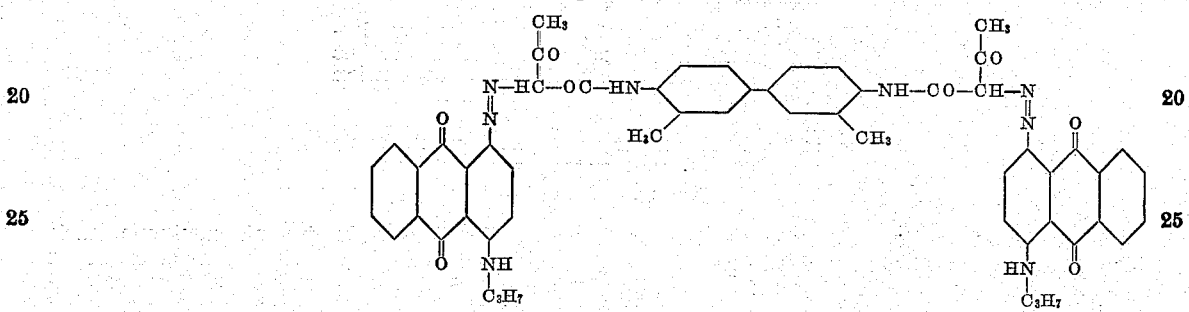

(3) By using in Example 2 instead of 2.8-grams of 1-amino-4-n-propylaminoanthraquinone, 2.9 grams of 1-amino-4-n-butylaminoanthraquinone, a green dyeing of good fastness properties is likewise obtained.

(4) By using in Example 2 instead of 2.8-grams of 1-amino-4-n-propylaminoanthraquinone, 2.5 grams of 1-amino-4-methylaminoanthraquinone, a yellowish-green dyeing of good fastness properties is obtained.

(5) *I. Grounding liquor*

| | | |
|---|---|---|
| 5 | grams | of 2-(4'-acetoacetylamino-)phenyl-benzimidazole are dissolved, while boiling, with |
| 5 | cc. | of Turkey red oil, |
| 7.5 | cc. | of caustic soda solution of 34° Bé. and |
| 28 | grams | of sodium sulfate; the solution is made up with water to |
| 1 | liter | |

*II. Developing bath*

| | | |
|---|---|---|
| 3.1 | grams | of 1-amino-4-phenylaminoanthraquinone are diazotized with |
| 3.8 | cc. | of hydrochloric acid and |
| 0.8 | gram | of sodium nitrite; thereupon about |
| 4 | grams | of sodium acetate and |
| 25 | grams | of sodium chloride are added, and the whole is made up with cold water to |
| 1 | liter | |

An olive-green dyeing of good fastness properites is obtained.

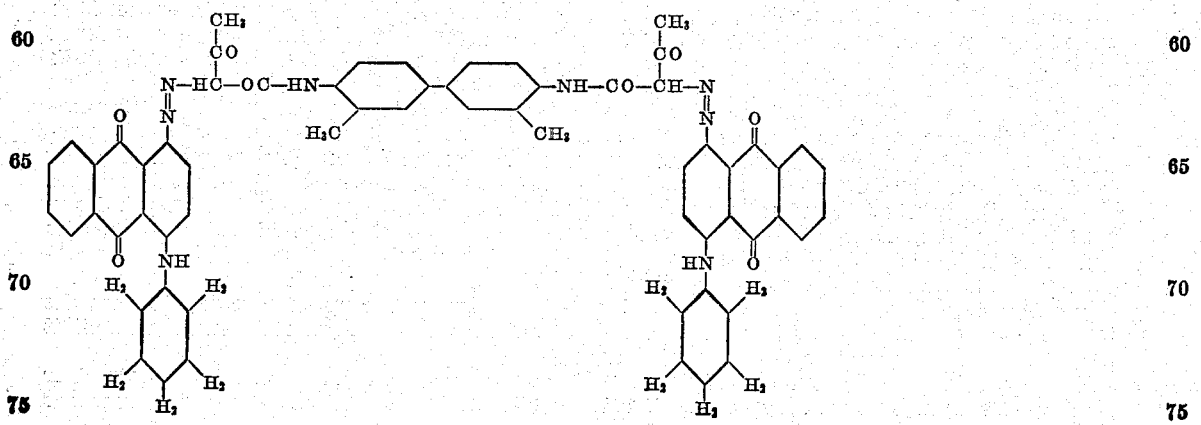

The dyestuff corresponds to the formula:

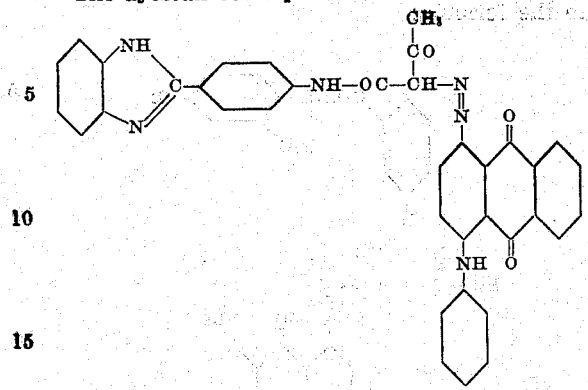

(6) By using in Example 5 instead of 3.1 grams of 1-amino-4-phenylaminoanthraquinone, 3.8 grams of 1-amino-4, 4'-N-methylacetylamino-phenylaminoanthraquinone, an olive-green dyeing of good fastness properties is obtained. The dyestuff formed has the formula:

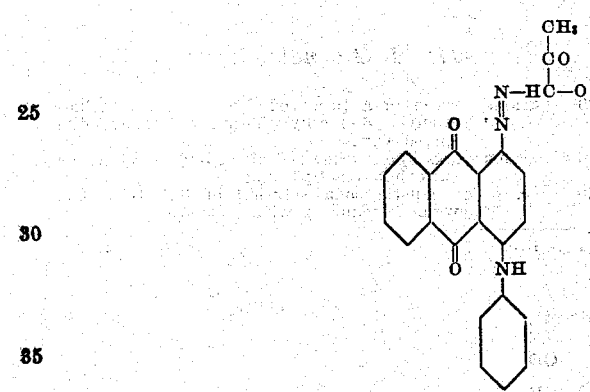

(7) *I. Grounding liquor*

1.75 grams of diacetoacetyl-ortho-tolidide are dissolved as indicated in Example 1; the solution is made up with water to
1 liter

*II. Developing bath*

3.1 grams of 1-amino-4-phenylaminoanthraquinone are diazotized as indicated in Example 5. After addition of sodium acetate and sodium chloride, the whole is made up with cold water to 1 liter. An olive green dyeing of good fastness properties is obtained.

The dyestuff may be represented by the formula:

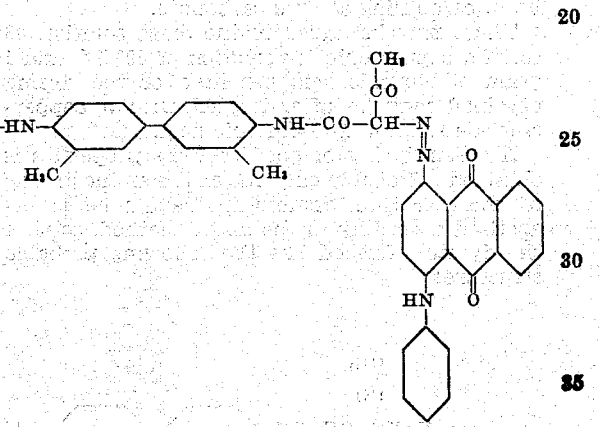

(8) *I. Grounding liquor*

1.75 grams of diacetonacetyl-ortho-tolidide are dissolved as indicated in Example 1 and made up with water to
1 liter

*II. Developing bath*

3.5 grams of 1-methylamino-4(4'-aminophenyl)-aminoanthraquinone are diazotized with
4.1 cc. of hydrochloric acid of 20° Bé. and
0.72 gram of sodium nitrite (dissolved). Thereupon the whole is neutralized by means of about
4–5 grams of sodium acetate. Thereafter
2 cc. of acetic acid (of 50% strength) and
25 grams of sodium chloride are added. The whole is made up with water to
1 liter A green dyeing of good fastness properties is obtained. The dyestuff has the following structure:

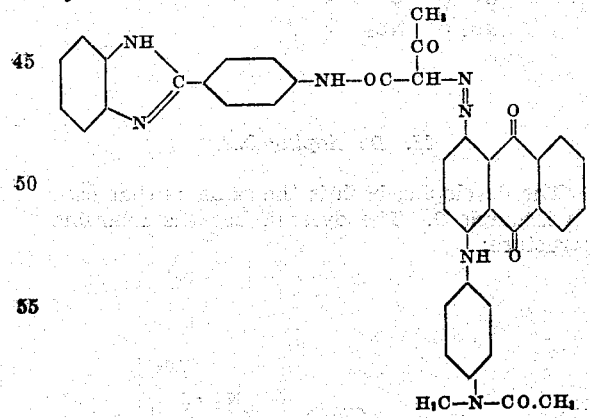

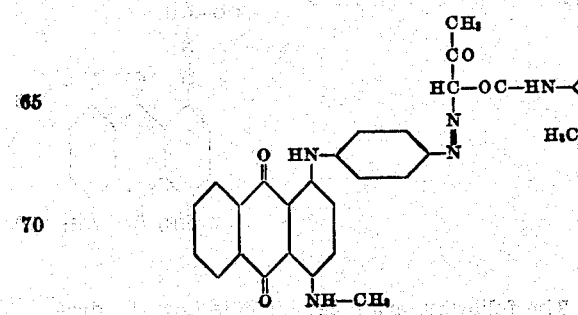

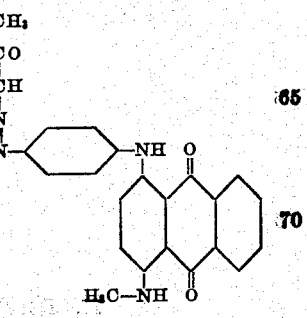

(9) I. Grounding liquor

- 15 grams of diacetoacetyl-ortho-tolidide are dissolved with
- 15 grams of sodium Turkey red oil of 50% strength or sulforicinate (1:1) and
- 22.5 grams of caustic soda solution of 34° Bé.; the solution is made up with water to
- 1 liter

II. Developing bath

- 6.7 grams of 1,4,5,8-tetraaminoanthraquinone are diazotized with
- 20 cc. of formic acid of 96% strength,
- 50 cc. of ice water,
- 28 cc. of hydrochloric acid of 22° Bé. and
- 28 cc. of sodium nitrite solution (of 30% strength.) Thereupon the whole is made up with cold water to
- 1 liter and neutralized, before use, by means of
- 20 grams of sodium acetate.

The dyed material is exposed to the air for some time and washed and soaped in a boiling soap bath, containing sodium carbonate.

There may be added to the diazo solution 30 cc. of a copper-chloride solution of 40° Bé. and 1 gram of chromic acid per liter, or the dyeing obtained may be after-treated with a copper-chloride solution and chromic acid.

A green dyeing of good fastness properties is obtained. Probably only one of the amino groups of the 1.4.5.8-tetraamino-anthraquinone is diazotized according to the above method, so that the dyestuff formed has the following probable structure:

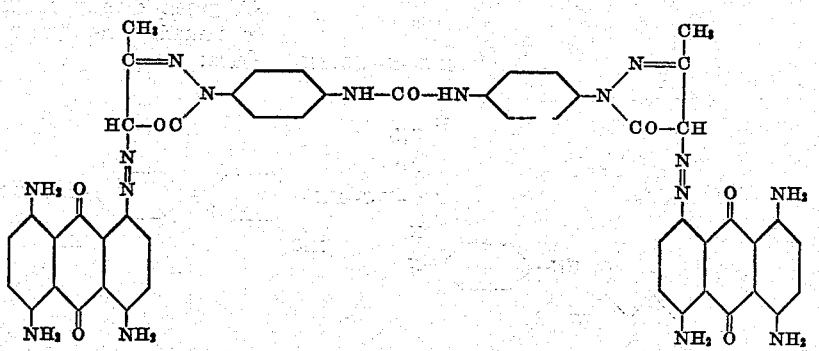

(10) I. Grounding liquor

- 25 grams of the pyrazolone prepared from meta-aminobenzoic acid-5-chloro-2-toluidide are dissolved with
- 25 grams of sodium Turkey red oil of 50% strength and
- 37.5 cc. of caustic soda solution of 34° Bé. The whole is made up with water to
- 1 liter

II. Developing bath

The developing bath is the same as that used in Example 9. The dyestuff formed corresponds to the formula:

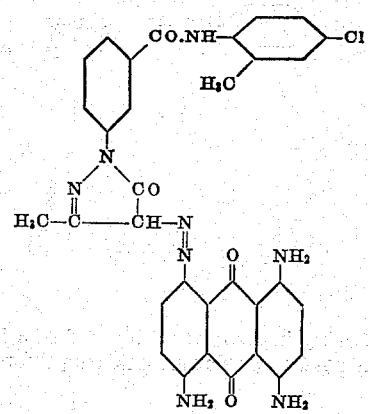

(11) I. Grounding liquor

- 20 grams of the urea prepared from 1 (para-aminophenyl)-3-methyl-5-pyrazolone are dissolved with
- 20 grams of sodium Turkey red oil of 50% strength or sulforicinate (1:1 and
- 30 cc. of caustic soda solution of 34° Bé. The whole is made up with water to
- 1 liter

II. Developing bath

The developing bath is the same as that used in Example 9. The dyestuff has the following structure:

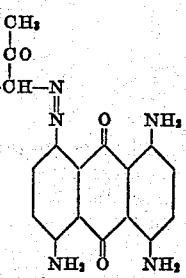

The following examples indicate how the dyestuffs may be produced on the fiber by printing:

(12) I. *Grounding liquor*

| | | |
|---|---|---|
| 25 | grams | of diacetoacetyl-ortho-tolidide, |
| 25 | grams | of sodium Turkey red oil of 50% strength or sulforicinate (1:1) and |
| 37.5 | cc. | of caustic soda solution of 34° Bé. are made into a paste and dissolved with |
| 500 | cc. | of hot water. The whole is made up with cold water to |
| 1 | liter | |

The bleached cotton material is padded with this solution and, after being dried at a temperature of 50° C. to 60° C., printed with the following paste:

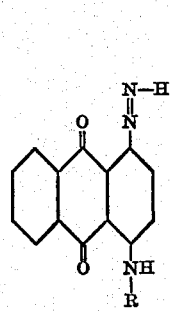

II. *Printing paste*

| | | |
|---|---|---|
| 9 | grams | of 1,4,5,8-tetraamino-anthraquinone are dissolved in |
| 30 | cc. | of formic acid of 96% strength and diluted with |
| 50 | cc. | of ice water. Thereupon |
| 35 | cc. | of hydrochloric acid of 22° Bé. and |
| 35 | cc. | of sodium nitrite (of 30% strength) are added, and the whole is diazotized at a temperature of about 15° C. Thereupon the whole is made up with |
| 321 | cc. | of cold water to |
| 480 | grams; | this solution is stirred into |
| 500 | grams | of tragacanth (60:1000). Before use, |
| 20 | grams | of sodium acetate are added. |
| 1 | kilogram | |

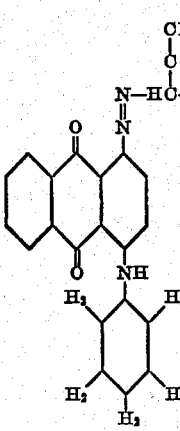

The printed material is dried, rinsed and soaped in a boiling soap bath containing 1 gram of calcined sodium carbonate per liter, again rinsed and dried.

The dyestuff formed is identical with that obtainable according to Example 9.

(13) Bleached cotton material is padded as described above with the following solution:

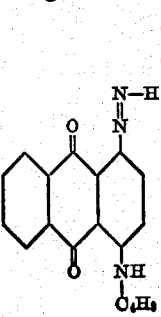

*Grounding liquor*

| | | |
|---|---|---|
| 25 | grams of | diacetoacetyl-para-phenylendiamide are dissolved with |
| 25 | grams | of sodium Turkey red oil of 50% strength or sulforicinate (1:1), |
| 37.5 | cc. of | caustic soda solution of 34° Bé. and a small quantity of water. The solution is made up with water to |
| 1 | liter | |

The further treatment and printing is carried out as stated in Example 12.

We claim:

1. The azo-dyestuffs of the general formula:

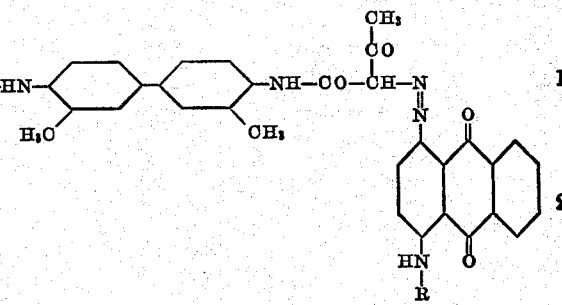

wherein the R's stand for alkyl groups, radicles of the benzene series or hexahydrophenyl radicles, which dyestuffs, being free from any substituents rendering the products soluble in water or alkalies, are insoluble in water and yield, when produced on the fiber, green dyeings.

2. The azo-dyestuff of the formula:

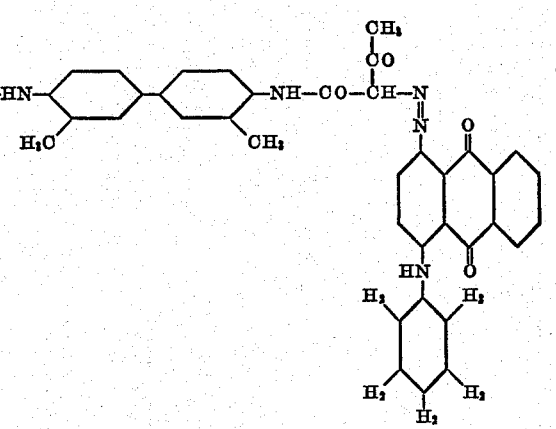

being insoluble in water and yielding, when produced on the fiber, green dyeings of good fastness properties.

3. The azo-dyestuff of the formula:

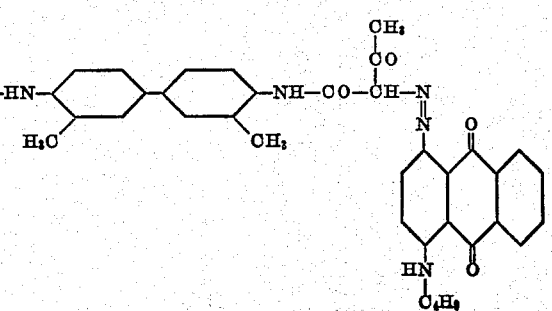

being insoluble in water and yielding, when produced on the fiber, green dyeings of good fastness properties.

4. Fiber dyed with a dyestuff referred to in claim 1.

5. Fiber dyed with a dyestuff referred to in claim 2.

6. Fiber dyed with a dyestuff referred to in claim 3.

WERNER KIRST.
MAX KERTH.